United States Patent Office 3,439,033
Patented Apr. 15, 1969

3,439,033
BENZENE-SULFONYL UREAS
Erich Haack, Heidelberg, Wilhelm Peschke and Kurt Stach, Mannheim, Felix H. Schmidt, Mannheim-Neuostheim, and Helmut Weber, Frankfurt am Main, Germany, assignors to C. F. Boehringer & Soehne G.m.b.H., Mannheim-Waldhof, Germany, a German corporation
No Drawing. Filed June 1, 1965, Ser. No. 460,502
Claims priority, application Germany, June 10, 1964, B 77,176
Int. Cl. C07c 127/00, 143/38
U.S. Cl. 260—553                4 Claims

ABSTRACT OF THE DISCLOSURE

Highly effective antidiabetic agents comprising benzene-sulfonyl ureas and the alkali metal salts thereof wherein the free compound corresponds to the formula:

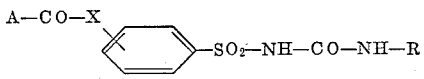

wherein A is an aliphatic, cycloaliphatic, aryl, aralkyl, aralkoxyalkyl or heterocyclic radical, X is a divalent aliphatic radical and R is an aliphatic or cycloaliphatic radical (which can be interrupted by oxygen or sulfur atoms) an aryl or aralkyl radical.

---

This invention relates to new therapeutic compositions having antidiabetic activity. More particularly, the invention relates to certain benzene-sulfonyl ureas having antidiabetic properties and to the preparation of such compounds and the formulation thereof as therapeutically useful compositions.

It is known that various benzene-sulfonyl ureas possess blood sugar decreasing activity and are suitable for use as oral administrable antidiabetic agents (cf., for example, Arzneimittel-Forschung, 8, 448–454/1958). In particular, $N_1$-sulfanilyl-$N_2$-(n-butyl)-urea and $N_1$-(4-methyl-benzene-sulfonyl)-$N_2$-(n-butyl)-urea have achieved great importance in diabetes therapy.

The active antidiabetic agents in accordance with the present invention can be identified as benzene-sulfonyl ureas of the formula

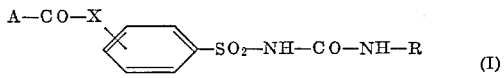 (I)

wherein A is an unsubstituted or substituted, or straight or branched chain, saturated or unsaturated, aliphatic or cycloaliphatic radical, an unsubstituted or substituted, aryl, aralkyl, or aryloxyalkyl radical or a heterocyclic radical; X is a straight or branched chain, saturated or unsaturated divalent aliphatic radical; and R is a straight or branched chain, saturated or unsaturated aliphatic or cycloaliphatic radical, which may be interrupted by oxygen or sulphur atoms or an unsubstituted or substituted aryl or aralkyl radical.

These compounds possess surprisingly strong blood sugar reducing activity. This degree of activity appears to be unique with the foregoing compounds and is not found in even quite closely related benzene-sulfonyl ureas.

The active compounds of the present invention can be prepared by the various methods known for the synthesis of substituted ureas. Some presently preferred procedures are hereinafter set out:

(a) Reaction of a benzene-sulfonyl compound of the formula:

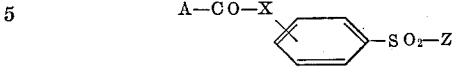

with a compound of the formula U—R, wherein A, X, and R are as above, one of the substituents Z and U is an amino group and the other is an isocyanate group or a substituent converted into an isocyanate group under the reaction conditions.

Thus, for example, a sulfonyl isocyanate is reacted with an amine of the formula R—$NH_2$, wherein R is as above, or with an acyl derivative thereof or, alternatively, a sulfonamide, advantageously in the form of its sodium or potassium salt, is condensed with an isocyanate of the formula R—NCO, wherein R is as above. In place of the isocyanates, there can also be used those compounds which, under the reaction conditions, are capable of conversion into an isocyanic acid ester. As "isocyanate formers" of this type, there can be used, for example, carbamic acid halides, urethanes, thiourethanes, ureas, acyl derivatives of ureas, and disulfonyl ureas;

(b) Hydrolysis of benzene-sulfonyl thioureas of the formula:

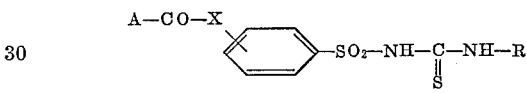

wherein A, R, and X are as above, or of benzene-sulfonyl-guanidines of the formula:

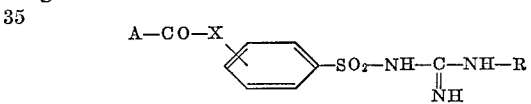

wherein A, R, and X are as above, or of benzene-sulfonyl-isourea ethers of the formula:

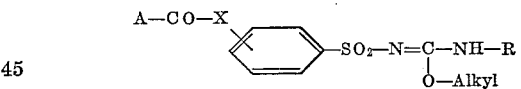

wherein A, R, and X are as above;

(c) Reaction of benzene-sulfonyl halides of the formula:

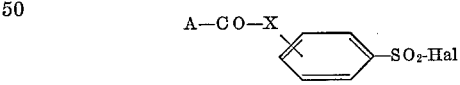

wherein A and X are as above and Hal is a halogen atom, with ureas of the formula $H_2N$—CO—NH—R, wherein R is as above defined. In this procedure, in place of the ureas there can also be used the corresponding parabanic acid derivatives of the formula:

in which R is as above.

In the above-mentioned syntheses, the moiety

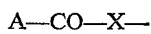

can also first be introduced into the final sulfonyl ureas. The following are reactions for this purpose:

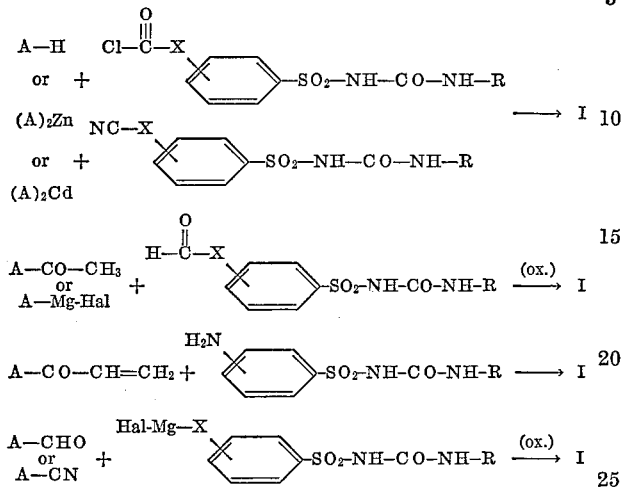

In the above formulas, A, R, X, and Hal are as above defined.

The novel benzene sulfonyl urea compounds of this invention can be converted into their alkali metal, alkaline earth metal or ammonium salts in the conventional manner. Thus, for example, the alkali metal salts of the benzene sulfonyl urea compounds of this invention can be prepared by dissolving the selected compound in an aqueous or alcoholic solution of the alkali metal hydroxide and, if desired, isolating the salt by evaporating the solvent. Any of the conventional alkali metal salts such as the sodium, potassium, lithium, or the like salts, can be prepared by this method or by other methods known to organic chemists.

The benzene-sulfonyl urea compounds of this invention, as well as the corresponding alkali, alkaline earth metal, and ammonium salts are new compounds, and both of these series of compounds have a surprisingly high order of antidiabetic activity.

The preparation of these compounds is more fully described in the following examples. It is to be understood, however, that the examples are illustrative of the compounds embraced by this invention and of the methods for their preparation, and are not to be construed as limiting the invention to the particular compounds or methods specifically described.

EXAMPLE 1

$N_1$-[p-(β-benzoyl-ethyl)-benzene-sulfonyl]-$N_2$-cyclohexyl-urea 8 g. cyclohexyl isocyanate were added dropwise, over a period of 1 hour and at about a temperature of +10° C., to 11.5 g. p-(β-benzoyl-ethyl)-benzene-sulfonamide which had previously been dissolved in 20 ml. 2 N sodium hydroxide solution, 100 ml. water and 100 ml. acetone. The resulting reaction mixture was kept at room temperature for 1 hour. Any undissolved material was filtered off and dilute hydrochloric acid was then added to the filtrate until a pH of 8.1 was obtained. Following a further addition of dilute hydrochloric acid, the crystalline slurry which separated was filtered off with suction. The yield amounted to 4.6 g. (28.5% of theory). After recrystallization from methanol, the $N_1$-[p-(β-benzoyl-ethyl)-benzene-sulfonyl]-$N_2$-cyclohexyl urea which was obtained melted at 184–185° C.

The p-(β-benzoyl-ethyl)-benzene-sulfonamide required as starting material can be prepared in the following manner:

p-Nitrobenzaldehyde was first condensed with aceto-phenone producing β-benzoyl-p-nitrostyrene (M.P. 163–164° C.; yield 80% of theory). The β-benzoyl-p-nitrostyrene was reduced with stannous chloride and hydrochloric acid producing β-benzoyl-p-aminostyrene (M.P. 153–154° C.; yield 71.5% of theory) which was diazotized using the Meerwein-Sandmeyer method. The crude p-(β-benzoyl-vinyl)-benzene-sulfonyl chloride so obtained (M.P. 146–148° C.; yield 48% of theory) was reacted with ammonia whereby the corresponding sulfonamide (M.P. 186–188° C.; yield 75% of theory) was obtained. The latter was dissolved in dilute sodium hydroxide solution and methanol and partially hydrogenated at room temperature in the presence of a palladium-barium sulfate catalyst producing the p-(β-benzoyl-ethyl)-benzene-sulfonamide (M.P. 154–156° C.; yield 75% of theory).

EXAMPLE 2

$N_1$-[p-(γ-benzoyl-propyl)-benzene-sulfonyl]-$N_2$-cyclohexyl-urea 13.5 g. p-(γ-benzoyl-propyl)-benzene-sulfonamide, were dissolved in 500 ml. acetone, 150 ml. water and 70 ml. 1 N sodium hydroxide solution, and thereafter reacted, in the manner described in Example 1, with 8.2 g. cyclohexyl isocyanate. The resulting reaction mixture was further worked up as set out in Example 1. There were obtained 5.7 g. (30% of theory) $N_1$[p-(γ-benzoyl-propyl)-benzene-sulfonyl]-$N_2$-cyclohexyl-urea having a melting point of 180–181° C. (recrystallized from methanol).

The p-(γ-benzoyl-propyl)-benzene-sulfonamide required as starting material can be prepared in the following manner:

β-Nitrophenyl-ethyl bromide which had been obtained by the nitration of β-phenyl-ethyl bromide, was reacted with sodium malonic acid diethyl ester to give p-nitrophenyl-ethyl-malonic acid diethyl ester and the latter then saponified and decarboxylated producing γ-(p-nitrophenyl)-butyric acid (M.P. 92° C.; yield 50% of theory). Following treatment of the γ-p-nitrophenyl)-butyric acid with thionyl chloride, there was obtained the corresponding acid chloride (B.P. 168–171° C./0.4 mm. Hg) which was subjected to a Friedel-Crafts reaction with benzene and aluminum chloride, to produce α-(p-nitro-phenyl-ethyl)-acetophenone (M.P. 109–110° C.; yield 78% of theory). This nitro-ketone was then reduced with stannous chloride and alcoholic hydrochloric acid whereby the α-(p-aminophenyl-ethyl)-acetophenone was obtained (M.P. 66–68° C.; yield 83.5% of theory). The α(p-aminophenyl-ethyl)-acetophenone was diazotized by the Meerwein-Sandmeyer method and the resultant crude sulfonyl chloride thereafter reacted with ammonia to give p-(γ-benzoyl-propyl)-benzene-sulfonamide (M.P. 196–197° C.; yield 67% of theory).

EXAMPLE 3

$N_1$-[4-(butan-3'-on-1'-yl)-benzene-sulfonyl]-$N_2$-cyclohexyl-urea 15.1 g. 4-(butan-3'-on-1'-yl)-benzene-sulfonamide were dissolved in 33.5 ml. 2 N sodium hydroxide solution and 70 ml. acetone and thereafter mixed dropwise, with stirring and at 0–5° C., with 8.4 g. cyclohexyl isocyanate. The reaction mixture was further stirred for 3 hours and diluted with water. Any undissolved material present was separated off by filtering and the filtrate acidified. The $N_1$ - [4 - butan - 3' - on - 1' - yl) - benzene - sulfonyl]-$N_2$-cyclohexyl-urea which was thereby obtained in the form of crystals melted, after recrystallization from methanol, at 125–126° C.

The following compounds were obtained in an analogous manner:

$N_1$ - [4 - (butan-3'-on-1'-yl) - benzene-sulfonyl] - $N_2$-butyl-urea having a melting point of 99–100° C. (recrystallized from methanol);

$N_1$ - [4 - (butan-3'-on-1'-yl) - benzene-sulfonyl] - $N_2$- cyclo-octyl-urea having a melting point of 87–88° C. (recrystallized from methanol); and $N_1$ - [4 - (butan-3'-on-1'-yl) - benzene-sulfonyl] - $N_2$-(4-methyl-cyclohexyl)-urea having a melting point of 122–123° C. (recrystallized from methanol).

The 4-(butan-3'-on-1'-yl)-benzene-sulfonamide required as starting material was prepared in the following manner:

172 g. p-amino-benzene-sulfonamide were diazotized in the conventional manner in 240 ml. concentrated hydrochloric acid and 1 liter water with a solution of 69 g. sodium nitrite in 400 ml. water. The diazonium solution was thereafter mixed with 500 ml. acetone and 92 g. methyl vinyl ketone and also gradually, in small portions, with 50 g. cuprous chloride. A vigorous evolution of nitrogen set in and the temperature of the reaction mixture rose to almost 40° C. The reaction mixture was stirred for a further 20 minutes. The resultant oil was 4-(2'-chlorobutan-3'-on-1'-yl)-benzene-sulfonamide which was further worked up without purification. All of the crude product was dissolved in 700 ml. glacial acetic acid and mixed portion-wise with 250 g. zinc dust. The reaction mixture was heated on a steam bath for 2 hours, filtered using suction and the filtrate evaporated. The residue crystallized following mixing the water. The crystals were filtered off with suction and recrystallized from methanol. The 4-(butan-3'-on-1'-yl)-benzene-sulfonamide was obtained in good yield and melted at 94–96° C.

EXAMPLE 4

$N_1$-[p-(δ-benzoyl-butyl)-benzene-sulfonyl]-$N_2$-cyclohexyl-urea

There were obtained by reaction of 12.6 g. p(δ-benzoyl-butyl)-benzene-sulfonamide, dissolved in 140 ml. acetone, 70 ml. water and 20 ml. 2 N sodium hydroxide solution and 6 g. cyclohexyl-isocyanate followed by the conventional working up, 4.4 g. (28% of theory) $N_1$-[p-(δ-benzoyl-butyl)-benzene-sulfonyl]-$N_2$-cyclohexyl-urea having a melting point 154–156° C.

The p-(δ-benzoyl-butyl)-benzene-sulfonamide required as starting material was prepared as follows:

p-Nitro-cinnamyl aldehyde and acetophenone were first condensed in the conventional manner and the reaction product (M.P. 168–170° C.; yield 40% of theory) hydrogenated at room temperature in glacial acetic acid in the presence of a palladium-barium sulfate catalyst producing p-(δ-benzoyl-butyl)-aniline (M.P. 70–71° C.; yield 50% of theory). This p-(δ-benzoyl-butyl)-aniline was subjected to a Meerwein-Sandmeyer reaction, whereby p-(δ-benzoyl-butyl)-benzene-sulfonamide (M.P. 116–118° C.; yield 58% of theory) was obtained.

EXAMPLE 5

$N_1$-[p-(γ-benzoyl-propyl)-benzene-sulfonyl]-$N_2$-(4-methoxy-cyclohexyl)-urea 6 g. (p-(γ-benzoyl-propyl)-benzene-sulfonyl ethyl urethane (prepared from p-(γ-benzoyl-propyl)-benzene-sulfonamide and ethyl chloroformate in acetone in the presence of potassium carbonate; M.P. 116–118° C.; yield 63% of theory) and 2.1 g. 4-methoxy-cyclohexyl-amine were heated with 6 ml. dimethyl formamide for 1 hour at 100° C. and for ½ hour at 120° C. (oil bath) and thereafter stirred into 150 ml. water. The separated crystalline slurry which formed was filtered off with suction, washed with water and dried. There were obtained 6.6 g. (90% of theory) $N_1$-[p-(γ-benzoyl-propyl)-benzene-sulfonyl]-$N_2$-(4-methoxy-cyclohexyl)-urea having a melting point of 130–131° C. (recrystallized from methanol).

The following compounds were obtained using an analogous procedure:

$N_1$ - [p - (γ-benzoyl-propyl)-benzene-sulfonyl]-$N_2$-(4-methyl-cyclohexyl)-urea; yield 96% of theory; M.P. 176–177° C. (recrystallized from methanol);

$N_1$ - [p - (γ-benzoyl-propyl)-benzene-sulfonyl]-$N_2$-(4-ethyl-cyclohexyl)-urea; yield 81% of theory; M.P. 154–156° C. (recrystallized from methanol); and $N_1$ - [p - (γ-benzoyl-propyl)-benzene-sulfonyl]-$N_2$-cyclooctyl-urea; yield 73% of theory; M.P. 124–125° C. (recrystallized from methanol).

EXAMPLE 6

$N_1$-{p-[γ-(p-chlorobenzoyl)-propyl]-benzene-sulfonyl}-$N_2$-cyclohexyl-urea 5.5 g. p-[γ-(p-chlorobenzoyl)-propyl]-benzene-sulfonyl-ethyl urethane (M.P. 137–139° C. which had been prepared in a yield amounting to 78% of theory by a procedure analogous to that used for the production of p-(γ-benzoyl-propyl) - benzene - sulfonyl-ethyl urethane) and 1.35 g. cyclohexylamine were reacted in 5 ml. dimethyl formamide and the reaction mixture worked up. There were obtained 4.6 g. (74% of theory) $N_1$-{p-[γ-(p-chlorobenzoyl) - propyl] - benzene - sulfonyl}-$N_2$-cyclohexyl-urea having a melting point of 172–173° C. (recrystallized from methanol).

In an analogous manner there was obtained $N_1$-{p-[γ-(p-chlorobenzoyl) - propyl] - benzene-sulfonyl}-$N_2$-(4-methyl-cyclohexyl)-urea; yield 53% of theory; M.P. 168–169° C. (recrystallized from methanol).

The p - [γ-(p-chlorobenzoyl)-propyl]-benzene-sulfonamide required as starting material was prepared in the following manner:

Chlorobenzene and p-nitrophenyl-butyric acid chloride were first reacted in a Friedel-Crafts reaction to give p-[γ-(p-chlorobenzoyl)-propyl]-nitrobenzene (M.P. 82–84° C.; yield 54% of theory), the nitro group of which was reduced with stannous chloride and alcoholic hydrochloric acid to give the corresponding amine (M.P. 114–116° C.; yield 78% of theory) which was then converted into the corresponding sulfonyl chloride by a Meerwein-Sandmeyer reaction and the sulfonyl chloride then reacted with ammonia to give the desired sulfonamide (M.P. 154–156° C.; yield 67% of theory).

EXAMPLE 7

$N_1$-[p-(γ-benzoyl-propyl)-benzene-sulfonyl]-$N_2$-(4-isopropoxy-cyclohexyl)-urea 4.3 g. p - (γ - benzoyl - propyl)-benzene-sulfonyl-ethyl urethane were heated under reflux for 1½ hours with 1.8 g. 4 - isopropoxy - cyclohexylamine in 100 ml. toluene. After cooling, the clear solution was extracted twice with 75 ml. amounts of 0.5 N sodium hydroxide solution. The aqueous solution was clarified by shaking out with ether and adjusted to pH 6 with dilute hydrochloric acid. The sulfonyl-urea, which was thereby separated out in the form of crystals, was filtered off with suction, washed with water, dried in a vacuum and recrystallized from methanol. Yield 65% of theory; M.P. 118–120° C.

The following compounds were obtained in an analogous manner:

$N_1$ - [p-(γ-benzoyl-propyl)-benzene-sulfonyl]-$N_2$-n-butyl-urea by the reaction of 11.2 g. p-(γ-benzoyl-propyl)-benzene-sulfonyl-ethyl urethane with 2.2 g. n-butylamine; yield 88% of theory; M.P. 136–137° C. (recrystallized from ethanol); and $N_1$ - [p - (γ-benzoyl-propyl)-benzene-sulfonyl]-$N_2$-(β-phenyl-ethyl)-urea by the reaction of 11.2 g. p-(γ-benzoyl-propyl)-benzene-sulfonyl-ethyl urethane with 3.7 g. β-phenyl-ethylamine; yield 89% of theory; M.P. 108–110° C. (recrystallized from ethanol).

EXAMPLE 8

$N_1$-[p-(β-benzoyl-vinyl)-benzene-sulfonyl]-$N_2$-cyclohexyl-urea

This compound was prepared by a method analogous to that described in Example 7, by the reaction of 10.8 g. p-(β-benzoyl-vinyl)-benzene-sulfonyl-ethyl urethane with 3 g. cyclohexylamine. Yield 79% of theory; M.P. 202° C. (recrystallized from aqueous acetone).

In an analogous manner, there was obtained, using 3.4 g. trans - 4 - methyl-cyclohexylamine, $N_1$-[p-($\beta$-benzoyl-vinyl) - benzene - sulfonyl] - $N_2$-(4-methyl-cyclohexyl)-urea; yield 78% of theory; M.P. 221–222° C. (recrystallized from alcohol-acetone (1:1)).

The sulfonyl urethane used as starting material was obtained by reacting p-($\beta$-benzoyl-vinyl)-benzene-sulfonamide and ethyl chloroformate in acetone in the presence of potassium carbonate; M.P. 180–181° C.; yield 43% of theory.

EXAMPLE 9

$N_1$-[p-($\gamma$-benzoyl-propyl)-benzene-sulfonyl]-$N_2$-(tetrahydrothiapyranyl-4)-urea $N_1$-[p - ($\gamma$ - benzoyl-propyl) - benzene - sulfonyl]-$N_2$-(tetrahydrothiapyranyl-4)-urea was prepared by a method substantially as described in Example 5, by the reaction of 11.2 g. p-($\gamma$-benzoyl-propyl)-benzene-sulfonyl - ethyl urethane with 3.5 g. 4-amino-tetrahydrothiapyran in 11 ml. dimethyl formamide. Yield 69% of theory; M.P. 217° C.

EXAMPLE 10

$N_1$-[p-($\gamma$-p-toluyl-propyl)-benzene-sulfonyl]-$N_2$-cyclohexyl-urea

The preparation of $N_1$-[p-($\gamma$-p-toluyl - propyl)-benzene-sulfonyl]-$N_2$-cyclohexyl-urea was carried out by a method analogous to that described in Example 5, by the reaction of 4.3 g. p-($\gamma$-p-toluyl-propyl)-benzene-sulfonyl-ethyl-urethane with 1.1 g. cyclohexylamine in 4 ml. dimethyl formamide. Yield 84% of theory; M.P. 191° C. (recrystallized from methanol).

In an analogous manner, there was obtained, using 1.2 g. trans-4-methyl-cyclohexylamine, $N_1$-[p - ($\gamma$ - toluyl-propyl)-benzene-sulfonyl]-$N_2$-(4 - methyl - cyclohexyl)-urea; yield 72% of theory; M.P. 180–181° C. (recrystallized from methanol).

The sulfonyl urethane used as starting material was prepared as follows:

Toluene and p-nitrophenyl-butyric acid chloride were first reacted by a Friedel-Crafts reaction producing p-($\gamma$-p-toluyl-propyl)-nitrobenzene (M.P. 85–86° C.; yield 53% of theory). The nitro group of the p-($\gamma$-p-toluyl-propyl)-nitrobenzene was reduced with stannous chloride in alcoholic hydrochloric acid giving the corresponding amino compound (yield 82% of theory; M.P. 108–109° C.). The corresponding sulfonyl chloride was prepared therefrom by a Meerwein-Sandmeyer reaction (M.P. 78–80° C.) and this compound was converted with ammonia into p-($\gamma$-toluyl-propyl)-benzene-sulfonamide (yield 64% of theory; M.P. 183–184° C.). From this sulfonamide there was obtained the corresponding sulfonyl-urethane by reaction with ethyl chloroformate in acetone in the presence of potassium carbonate (yield 50%; M.P. 126–128° C.).

EXAMPLE 11

$N_1$-[p-($\gamma$-o-methoxy-benzoyl-propyl)-benzene-sulfonyl]-$N_2$-cyclohexyl-urea 5.5 g. p-($\gamma$-o-methoxy-benzoyl-propyl) - benzene-sulfonyl-ethyl urethane (prepared from p-($\gamma$-o-methoxy-benzenoyl-propyl)-benzene-sulfonamide and ethyl chloroformate in acetone in the presence of potassium carbonate, M.P. 132–133° C.; yield 71% of theory) in 100 ml. toluene and 20 ml. dimethyl formamide were mixed with 1.36 g. cyclohexylamine and the clear solution obtained gently boiled for 1 hour. After cooling, the reaction mixture was stirred with 60 ml. water and the crystalline product which separated out filtered off with suction. It was washed with water and dried in a vacuum. After recrystallization from methanol, there were obtained 5.2 g. (84% of theory) $N_1$-[p-($\gamma$-o-methoxy-benzoyl-propyl)-benzene-sulfonyl]-$N_2$-cyclohexyl-urea having a melting point of 191–192° C.

EXAMPLE 12

$N_1$-[p-($\gamma$-$\beta$-naphthoyl-propyl)-benzene-sulfonyl]-$N_2$-cyclohexyl-urea 10 g. p-($\gamma$-$\beta$-naphthoyl-propyl)-benzene-sulfonyl-ethyl urethane (prepared from p-($\gamma$-$\beta$-naphthoyl-propyl)-benzene-sulfonamide and ethyl chloroformate in acetone in the presence of potassium carbonate; M.P. 79° C.; yield 68% of theory) in 200 ml. toluene and 50 ml. dimethyl formamide were gently boiled for 1 hour with 2.4 g. cyclohexylamine. The reaction mixture was worked up in a manner analogous to that described in Example 11 and yielded 9.4 g. (81.7% of theory) $N_1$-[p-($\gamma$-$\beta$-naphthoyl-propyl)-benzene-sulfonyl]-$N_2$-cyclohexyl - urea having a melting point of 202° C.

In an analogous manner, there were obtained, using 8.2 g. of the above-mentioned sulfonyl-urethane and 2.26 g. trans-4-methyl-cyclohexylamine, $N_1$-[p-($\gamma$-$\beta$-naphthoyl-propyl)-benzene-sulfonyl]-$N_2$ - (4 - methylcyclohexyl)-urea. Yield 78% of theory; M.P. 186–187° C.

The p-($\gamma$-$\beta$-naphthoyl - propyl)-benzene - sulfonamide required as starting material was prepared in the following manner:

Naphthalene was first reacted in boiling carbon disulfide with p-nitrophenyl-butyric acid chloride by a Friedel-Crafts reaction producing p-($\gamma$-$\beta$-naphthoyl-propyl)-nitrobenzene (M.P. 129–130° C.; yield 66% of theory). Thereafter the nitro group was reduced with stannous chloride and alcoholic hydrochloric acid giving the corresponding amine (M.P. 123° C.; yield 98% of theory) from which there was prepared the corresponding sulfonyl chloride by a Meerwein-Sandmeyer reaction. The sulfonyl chloride was converted into the desired sulfonamide by reaction with ammonia (M.P. 209–210° C.; yield 62.7% of theory).

EXAMPLE 13

$N_1$-[p-($\gamma$-o-methoxy-benzoyl-propyl)-benzene-sulfonyl]-$N_2$-(4-methyl-cyclohexyl)-urea 5 g. p-($\gamma$-o-methoxy-benzoyl-propyl)-benzene-sulfonyl-ethyl urethane in 100 ml. toluene and 20 ml. dimethyl formamide were mixed with 1.3 g. trans-4-methyl-cyclohexylamine and the solution obtained gently boiled for 1 hour. The reaction mixture was worked up in a manner analogous to that described in Example 11 and yielded after recrystallization from ethanol 4.1 g. $N_1$-[p-($\gamma$-o-methoxy - benzoyl - propyl) - benzene-sulfonyl]-$N_2$-(4-methyl-cyclohexyl)-urea of melting point 184–185° C.

EXAMPLE 14

$N_1$-[p-($\gamma$-$\alpha$-naphthoyl-propyl)-benzene-sulfonyl]-$N_2$-cyclohexyl-urea 10 g. p-($\gamma$-$\alpha$-naphthoyl-propyl)-benzene-sulfonyl-ethyl urethane (prepared from p-($\gamma$-$\alpha$-naphthoyl-propyl)-benzene-sulfonamide and ethyl chloroformate in acetone in the presence of potassium carbonate; M.P. 54° C.; yield 68% of theory) in 200 ml. toluene and 50 ml. dimethyl formamide were gently boiled for 1 hour with 2.4 g. cyclohexylamine. The reaction mixture was worked up in a manner analogous to that described in Example 11 and yielded 7.6 g. (67% of theory) $N_1$-[p-($\gamma$-$\alpha$-naphthoyl-propyl)-benzene-sulfonyl]-$N_2$-cyclohexyl - urea having a melting point of 190–191° C.

The p-($\gamma$-$\alpha$-naphthoyl - propyl) - benzene-sulfonamide required as starting material was prepared in the following manner:

Naphthalene was first reacted in carbon disulfide at 0° C. with p-nitrophenyl-butyric acid chloride by a Friedel-Crafts reaction to give p($\gamma$-$\alpha$-naphthoyl-propyl)-nitrobenzene (yield 57% of theory). Thereafter the nitro group was reduced with stannous chloride and alcoholic hydrochloric acid giving the corresponding amine (yield 74% of theory) from which there was prepared the corresponding sulfonyl chloride by a Meerwein-Sandmeyer reaction.

The sulfonyl chloride was converted into the desired sulfonamide by reaction with ammonia (M.P. 102–103° C.; yield 65% of theory).

The compounds of this invention are active when administered orally or parenterally. For therapeutic use in order to ensure proper absorption and favorable therapeutic effect, they are preferably incorporated in suitable pharmaceutical carriers. In clinical use of these compounds, the recommended dosage is 50–800 mg., preferably 100–400 mg. of active drug, 2 to 4 times per day. Thus, in preparing tablets, capsules, elixirs or other dosage forms with pharmaceutical carriers, the formulation should preferably contain 100–400 mg. active drug per dosage unit.

The antidiabetic activity of the compounds of the invention was compared with that of certain of the popularly known sulfonyl ureas. The threshold dose toxicity ($LD_{50}$) and relative blood sugar reducing activity ($N_1$-sulfanilyl-$N_2$-(n-butyl)-urea=1) were determined for the following compounds:

(1) $N_1$-[p-($\gamma$-benzoyl-propyl) - benzene - sulfonyl]-$N_2$-(4-methyl cyclohexyl)-urea
(2) $N_1$-[p-($\gamma$-benzoyl-propyl) - benzene - sulfonyl]-$N_2$-(4-methoxy-cyclohexyl)-urea
(3) $N_1$-[p-($\gamma$-benzoyl - propyl) - benzene - sulfonyl]-$N_2$-cyclohexyl-urea
(4) $N_1$-[sulfonyl]-$N_2$-(n-butyl)-urea
(5) $N_1$-(p-toluyl sulfonyl)-$N_2$-(n-butyl)-urea
(6) $N_1$-(p-chloro-benzoyl - sulfonyl) - $N_2$ - propyl-urea (chloropropamide).

TABLE

| Compound No. | Threshold dose rabbit, i.v. | Relative blood sugar activity, i.v. | $LD_{50}$ p.o. Mouse (g./kg.) |
|---|---|---|---|
| 1 | 0.5 | 400 | |
| 2 | 0.5 | 400 | >2.0 |
| 3 | 1.0 | 200 | >5 |
| 4 | 200 | 1 | 4 |
| 5 | 20 | 10 | 2.5 |
| 6 | 10 | 20 | [1] 1.675 |

[1] J. A. Schneider, et al. Ann. N.Y., Acad. Sci. 74/3, 427, 1959.

We claim:
1. A member of the group consisting of benzene-sulfonyl ureas of the formula:

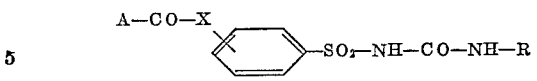

in which A is a member selected from the group consisting of lower alkyl, naphthyl, phenyl and substituted phenyl, wherein said substituent is a member selected from the group consisting of lower alkyl, lower alkoxy and chloro, X is a divalent aliphatic radical having 2–4 carbon atoms, and R is a member selected from the group consisting of tetrahydrothiapyranyl, cycloalkyl having 6 to carbon atoms and substituted cycloalkyl having 6 to 8 carbon atoms, wherein said substituent is a member selected from the group consisting of lower alkyl and lower alkoxy, and the therapeutically useful alkali salts thereof.

2. $N_1$-[p-($\gamma$-benzoyl-propyl) - benzene - sulfonyl]-$N_2$-(4-methyl-cyclohexyl)-urea.

3. $N_1$-[p-($\gamma$-benzoyl - propyl) - benzene - sulfonyl]-$N_2$-(4-methoxy-cyclohexyl)-urea.

4. $N_1$-[p-($\gamma$-benzoyl - propyl) - benzene - sulfonyl]-$N_2$ cyclohexyl-urea.

References Cited

UNITED STATES PATENTS

| 3,259,544 | 7/1966 | Wright | 167—65 |
| 3,320,312 | 5/1967 | Sigal et al. | 260—553 |
| 3,338,955 | 8/1967 | Aumuller et al. | 260—470 |

FOREIGN PATENTS 918,396  2/1963  Great Britain.

JOHN D. RANDOLPH, *Primary Examiner.*

U.S. Cl. X.R.

167—65; 260—141, 240, 309.5, 327, 397.7, 465, 470, 543, 552, 556, 580, 592